US006950993B2

(12) United States Patent
Breinberg

(10) Patent No.: US 6,950,993 B2
(45) Date of Patent: Sep. 27, 2005

(54) SYSTEM AND METHOD FOR AUTOMATIC AND DYNAMIC LAYOUT OF RESIZABLE DIALOG TYPE WINDOWS

(75) Inventor: Steven Adam Breinberg, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 09/682,185

(22) Filed: Aug. 2, 2001

(65) Prior Publication Data

US 2003/0025737 A1 Feb. 6, 2003

(51) Int. Cl.$^7$ ................................................. G09G 5/00
(52) U.S. Cl. ........................ 715/801; 715/815; 715/788
(58) Field of Search ................................ 715/788, 800, 715/801, 815, 825, 853, 780; 345/700, 732, 762, 763, 775, 779, 780, 781, 783, 788, 795, 800, 801, 804, 805, 809, 815, 825, 826, 840, 855

(56) References Cited

U.S. PATENT DOCUMENTS

| | | | | | |
|---|---|---|---|---|---|
| 5,745,122 A | * | 4/1998 | Gay et al. | .................... | 345/619 |
| 5,760,772 A | * | 6/1998 | Austin | ........................ | 345/798 |
| 5,886,694 A | * | 3/1999 | Breinberg et al. | .......... | 345/788 |
| 5,920,316 A | * | 7/1999 | Oran et al. | .................. | 345/779 |
| 6,111,573 A | * | 8/2000 | McComb et al. | ........... | 345/763 |
| 6,335,743 B1 | * | 1/2002 | Owings | ....................... | 345/801 |
| 6,392,673 B1 | * | 5/2002 | Andrew et al. | ............. | 345/800 |

OTHER PUBLICATIONS

SDSU & Roger Whitney, layouts, Dec. 21, 1998.*
Wiecha et al., "ITS: A Tool for Rapidly Developing Interactive Applications," ACM 1990.*
Dr. John R. Sullins, CSIS 3701: Advanced Object–Oriented Programming, Setting the Layout of Java Applications, 2000.*
Abstract Windowing Toolkit, Jul. 28, 2001.*

* cited by examiner

*Primary Examiner*—John Cabeca
*Assistant Examiner*—Tadesse Hailu
(74) *Attorney, Agent, or Firm*—Lyon & Harr, LLP; Mark A. Watson

(57) ABSTRACT

The present invention involves a new system and process for automatically and dynamically laying out elements within an overall window of a graphical user interface by using dynamically resizable frames, i.e., "FlowFrames" disposed within the window. FlowFrames are automatically and dynamically sized and positioned within the window, while one or more other frames, i.e., "child frames," representing one or more conventional controls, nested within the FlowFrames are also sized and positioned within the window as the window is generated or resized. In particular, each FlowFrame arranges its children horizontally in a row, but dynamically wraps them to one or more additional rows and positions them in accordance with predefined relationships between the children, where they cannot all fit into the same row. Further, the size of each FlowFrame is computed hierarchically from its children up to the overall window and then back down to the individual children.

37 Claims, 10 Drawing Sheets

SYSTEM AND METHOD FOR AUTOMATIC AND DYNAMIC LAYOUT OF RESIZABLE DIALOG TYPE WINDOWS

BACKGROUND OF INVENTION

1. Technical Field

The invention is related to software user interface windows, and in particular, to a system and method for automatically and dynamically sizing and positioning controls, including buttons, text, and other elements within a dialog window, or the like, of a computer software application.

2. Related Art

Software applications or computer programs are often run or executed in a windowing environment. Such windowing environments include, for example, any of the Windows® operating systems, or any of a number of other conventional windowing environments. Most of these conventional windowing environments commonly use dialog windows or the like to present information and receive input from a user. Dialog windows typically contain one or more controls, or groups of controls, such controls often including text or icons for informing a user as to the function of the controls.

Examples of typical controls used within a dialog window include both dynamic and static controls, such as, for example, push buttons, radio buttons, check boxes, edit boxes, text labels, list boxes, etc. For example, a dynamic control, such as a list box, may be placed in any sort of dialog window, such as a "File Open," a "File Save," or any other dialog window, to provide for user input or selection. Such list boxes typically contain a listing of files or documents available to the user for opening or saving. Further, dynamic controls, such as, for example, a "cancel button" also often include text on the button, i.e. the word "Cancel" on the button. Static controls, such as text labels, display organized information, such as, for example, text information, but do not, by themselves, provide for or receive user input.

One conventional method for creating dialog windows typically involves a labor-intensive process whereby every dialog box to be used by a particular application or computer program is laid out by manually specifying precise positions and dimensions of each individual control within a dialog. These positions and dimensions are typically stored as a set of resource data that is loaded by the operating system or application program whenever a particular dialog window is drawn or rendered.

If the text, language, or size of controls associated with such dialog windows is changed, a new layout for the dialog window is often required. This new layout again requires manually specifying precise positions and dimensions of each individual control within a dialog. Consequently, when translating a computer application from one language to another, such as, for example, from English to Japanese, it is frequently necessary to completely redesign many, or all, of the dialog windows associated with the translated application, as the size of any text associated with the controls of the translated dialog window is usually significantly different than the original text.

Further, because the position and dimensions of the controls within the dialog window of such schemes are fixed, resizing of such dialog windows is typically prevented. However, in cases where resizing of such dialog windows is allowed, resizing of the dialog window typically serves little purpose. For example, when the size of such a dialog window is decreased, the decrease in window size typically serves only to hide or clip portions of the controls within the dialog window. Alternatively, when the size of such a dialog window is increased, the increase in window size serves only to waste display space by creating a larger window having no information or controls within the expanded area, as the positions of the controls within the window remain fixed as noted above.

Other schemes for creating or laying out dialog windows have been developed that allow a program developer to specify the relative positions of the controls within the dialog window without specifying precise coordinates or dimensions of each control. Often, such schemes use the concept of "frames" which are disposed within the dialog window, and wherein each frame contains particular controls or other elements. At the time the dialog window is displayed (during the execution of the program to which the dialog belongs), these schemes automatically calculate the relative coordinates and dimensions of each control and then position and size the controls based on those coordinates and dimensions. Such schemes provide a way to ensure the efficient sizing and layout of the controls contained within a dialog window at the development stage of the software application to which the dialog window belongs. The sizes and layout of these controls are acted on at run time, as the dialog window is created on the user's computer. However, such systems do not allow for the dynamic resizing and repositioning of the controls within a dialog window in response to a user or system action to increase or decrease the size of the dialog window during use of the software application to which the dialog window belongs.

Still other schemes for creating or laying out dialog windows have been developed to allow a user to resize a dialog window. Such schemes expand on the aforementioned schemes to automatically reorganize the controls within the dialog window to adapt to the new dialog window size. Again, such schemes often use frames for laying out particular controls, with one or more controls again being disposed within frames which are themselves positioned within the dialog window. However, while such schemes are useful, they are limited by their inability to adapt to cases where a dialog window is horizontally resized such that controls within a particular row within the dialog window or frame will no longer fit within that row. In such cases, the controls within the row may be partially or completely clipped, so that the user is no longer able to fully view particular controls within the dialog window. Some schemes have attempted to address this issue by providing a scroll bar or the like within the dialog window to allow a user to view clipped or otherwise obscured portions of the dialog window. However, such schemes tend to degrade the user experience by requiring excessive interaction with dialog windows.

Finally, another scheme has attempted to address the problem of clipping or hiding controls when reducing the size of a dialog window. In particular, as defined by the JAVA™ 2 Platform, Standard Edition, v 1.3.1 API Specification, a "FlowLayout" class puts components, such as controls or buttons, in a row, within a user resizable "container" or dialog window. As with some of the aforementioned schemes, the JAVA™ FlowLayout scheme may use frames nested within the container to allow for relative layout of groups of controls within particular frames. If the horizontal space in the container, or frame within the container, is too small to put all the components in one row, FlowLayout automatically uses multiple rows to display the components by automatically wrapping the control or controls, as necessary to the next row. Similarly, as the container is expanded, all objects from lower rows that will fit into higher rows are automatically moved into the higher rows. Within each row, components are centered by default, and may also be either left-aligned, or right-aligned, as specified when the FlowLayout is created. However, this "FlowLayout" scheme is subject to several limitations. For example, the JAVA™ FlowLayout scheme fails to account for potential relationships between components existing within a single frame, such as, for example, text associated with a particular button or control, or related controls that should be kept together or in some sort of preferred orientation relative to each other.

Therefore, what is needed is a system and method for automatically and dynamically sizing and positioning controls, including buttons, text, and other elements within frames in a window of a computer software application as the window is resized. Further, as the size of individual controls is changed, such as when text associated with such controls is translated to another language, the system and method should automatically resize and reposition those elements within the window. In addition, such a system and method should allow for automatic repositioning of such elements with respect to predefined relationships between the elements.

SUMMARY OF INVENTION

The present invention involves a new system and method which solves the aforementioned problems, as well as other problems that will become apparent from an understanding of the following description by using dynamically resizable frames, i.e., "FlowFrames," within a window of a graphical user interface, such as a dialog window, to automatically lay out elements within that window. In particular, a system and method according to the present invention builds on conventional automatic layout schemes by automatically and dynamically sizing and positioning one or more FlowFrames within a window of a graphical user interface, as well as one or more other frames, i.e., "child frames" contained or nested within one or more dynamic rows within the FlowFrame, as the window is generated or resized. As indicated above, each FlowFrame contains one or more child frames. These child frames in turn contain one or more elements, including conventional controls, such as, for example, dynamic and static controls, including push buttons, radio buttons, check boxes, edit boxes, text labels, list boxes, etc.

Further, unlike conventional frame based automatic layout schemes, in order to effectively utilize the area within the dialog window, the width of each row of children within a FlowFrame is not computed from the widths of its children. In particular, in accordance with the present invention, the width of each row of children within a FlowFrame is automatically computed based, in part, on the width of the dialog or other window. Further, the width of each row of children within a FlowFrame is also programmatically adjusted based on its insetting or indenting due to surrounding or otherwise related dialog elements. Finally, the relative positions of its child (i.e., interior or nested) frames and associated controls are dynamically computed based on the width of the FlowFrame and on the widths of the children, rather than using explicitly programmed relative positions.

In other words, a FlowFrame uses additional information, other than just the size of its children, to determine its own size. In particular, a FlowFrame partially takes its own size from the window or dialog size, which as noted below, may itself be dynamically resized in one embodiment, and then computes its height based on that width with respect to the children within that flow frame. Specifically, unlike conventional schemes, the FlowFrame computes its size (i.e., height and width) hierarchically from the controls up to the overall parent or root window, and then back down to the individual controls. In addition, a FlowFrame arranges its child frames and any associated controls horizontally in a row, like a conventional "Horizontal Frame," but wraps them to multiple rows if they cannot all fit in the same row.

In general, a system for automatically and dynamically laying out elements within a window in accordance with the present invention begins by first specifying at least one dynamically resizable FlowFrame within a conventional hierarchical tree structure defining an overall parent window. Next, at least one child frame, is specified or placed within the FlowFrame. The size of the FlowFrame is then automatically computed based on the hierarchical tree structure, beginning with the children within each frame, up to the overall parent window, and then back down to the individual children within each frame. Next, a minimum sufficient number of horizontal rows are instantiated within each FlowFrame for displaying each of the children within each FlowFrame. In addition, the children within each FlowFrame are automatically arranged within the automatically instantiated horizontal rows. This information may then be used for automatically laying out and drawing a window such as a dialog window of a graphical user interface.

The conventional hierarchical tree structure noted above can be described as a logical, hierarchical, description of the window or dialog. This structure is created by dividing the window into regions, which are in turn divided into subregions, etc., all the way down to individual controls. This hierarchy is expressed as a "tree of frames," wherein each frame represents a rectangular region of the window. The root of the tree is a frame encompassing the entire window. Clearly, progressing down the tree, the frames get smaller and smaller, until the frame leaves are reached, with the frame leaves representing areas each occupied either by a single control, or by a group of two or more controls functioning as a single unit. Such controls, or control groups, i.e., "control frames," can include any of a number of conventional frame types. Each type of frame that can have multiple children, or each group of controls, also has a built-in "relation," like vertical or horizontal, specifying how its children are arranged within it. While most controls appear as leaves of the frame tree, a control can also appear in an internal node, such as a group-box (label-box) frame; this kind of frame indicates the rectangle occupied by the actual label box control, yet it also has one child commonly a vertical frame of other controls, which are contained inside the group-box. Such hierarchical structures are well known to those skilled in the art.

In a further embodiment of the present invention, as the size of individual controls associated with a child frame within a FlowFrame is changed, such as, for example, when text associated with such controls is translated to another language, the system and method automatically resizes and repositions those controls within the dialog window, or within one or more FlowFrames within the dialog window, in accordance with a set of predefined automatic layout rules.

In another embodiment, the system and method of the present invention automatically repositions elements within a dialog window or FlowFrame with respect to predefined relationships between such elements such as by "binding" those elements. For example, where it is desired that two or more consecutive children of a particular FlowFrame maintain adjacent positioning with respect to each other, such a relationship will be automatically maintained, space permitting, within rows of the FlowFrame. This will hold true even where it would be possible to more efficiently utilize space within rows instantiated within a flow frame by wrapping children to subsequent rows.

In a further embodiment, particular relationships between children or elements within a FlowFrame are emphasized or maintained through use of indenting functionality. This indenting functionality may be used when children within one or more rows are automatically wrapped to one or more subsequent rows.

In still another embodiment, automatically and dynamically laying out elements within a window is performed dynamically in real-time as a window is automatically or manually resized. For example, where a user resizes a window containing FlowFrames, the elements within the flow frame are automatically resized and repositioned in real-time as the user resizes the window. Thus, the user is able to watch the dynamic layout of the window as the size of the window changes. It should be noted that resizing of windows is a technique well known in the art, and can be accomplished in any number of ways, such as, for example, by selecting and dragging an edge or corner of the window using a conventional computer pointing device.

In a related embodiment, the automatic and dynamic layout of the window, and thus the children within FlowFrames within the window, is not performed until resizing of the window is completed. In such cases, an outline of the window size may be presented to the user as the window is resized. Once the resizing is complete, such as, for example, when the user releases a selected edge or corner of the window, the window is then automatically and dynamically laid out and drawn to the screen.

In addition to the just described benefits, other advantages of the present invention will become apparent from the detailed description which follows hereinafter when taken in conjunction with the accompanying drawing figures.

BRIEF DESCRIPTION OF DRAWINGS

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
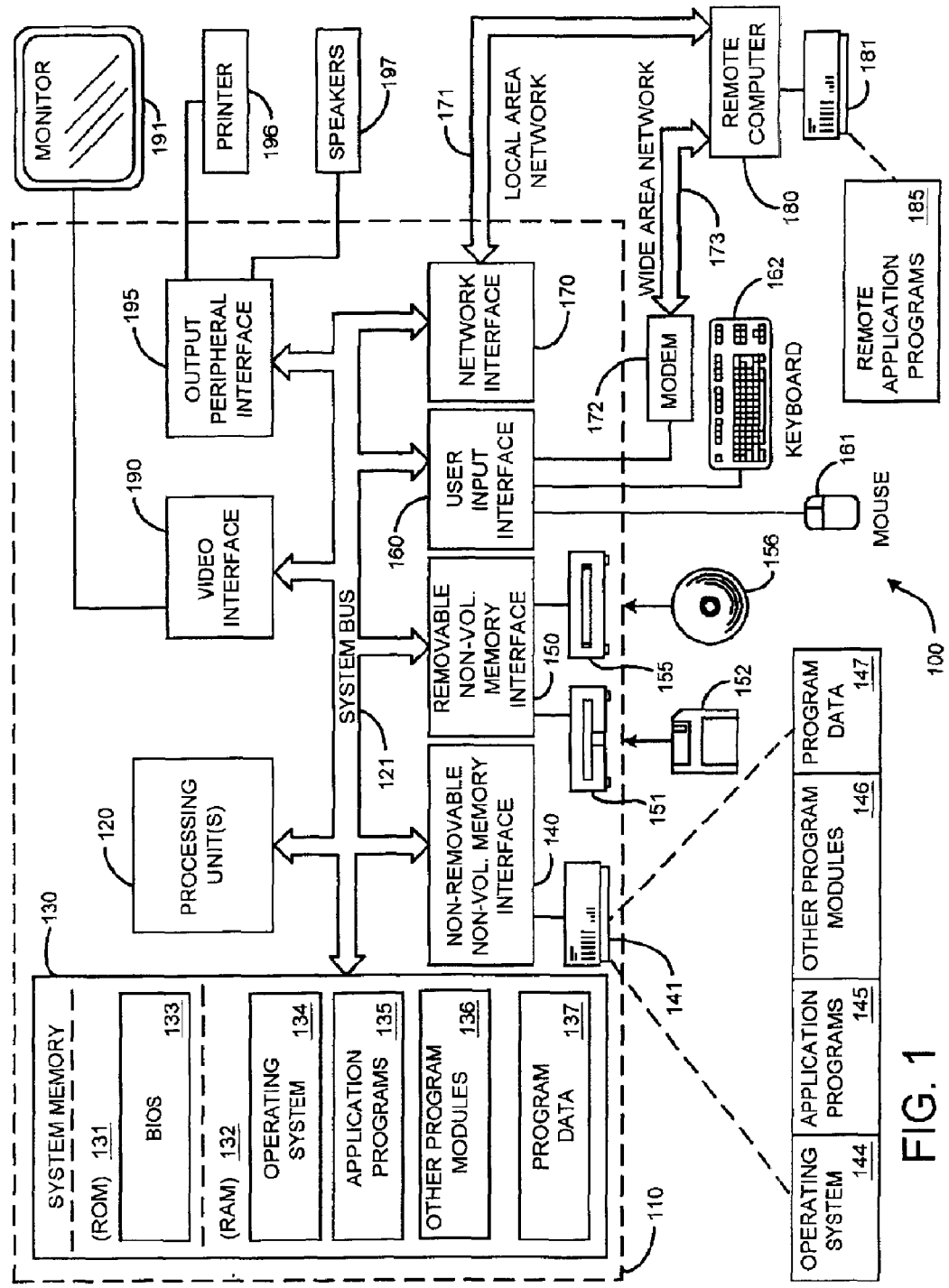
FIG. 1 is a diagram depicting a general-purpose computing device constituting an exemplary system for implementing the present invention.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 Introduction:

The present invention involves a new system and process for automatically and dynamically laying out elements within a window of a graphical user interface by using dynamically resizable frames, i.e., "FlowFrames" disposed within the window. Such windows include, for example, a dialog window, task pane, or workpane of a computer software application. FlowFrames are automatically and dynamically sized and positioned within the window of a graphical user interface, along with one or more other frames, i.e., "child frames" contained or nested within one or more dynamic rows within the FlowFrame, as the window is generated or resized. The child frames contained or nested within each FlowFrame in turn contain one or more elements, including conventional controls or control groups, such controls, including, for example, dynamic and static controls, including push buttons, radio buttons, check boxes, edit boxes, text labels, list boxes, etc.

Further, a FlowFrame arranges its children horizontally in a row, like a conventional "Horizontal Frame," but dynamically wraps the children to one or more additional rows, as necessary, in accordance with predefined relationships between the children, where they cannot all fit into the same row. Further, each FlowFrame computes its size hierarchically from its children up to the overall window and then back down to the individual children. Thus, the system and method of the present invention expands on the conventional concept of dialog "AutoLayout" by the addition of "Flow-Frames" as described herein.

It should be noted that the following discussion makes reference to wrapping of rows within a FlowFrame from a right-to-left context. In other words, the following discussion assumes that the rightmost object or objects will wrap in a FlowFrame, as described below, where there is insufficient horizontal space within the FlowFrame to host all of the objects in a single row. However, it should be understood that the right-to-left context of wrapping presupposes an English language or similar context wherein text is read from left to right. Clearly, wrapping may also occur in a left-to-right fashion wherein the leftmost object or objects will wrap in a FlowFrame where there is insufficient horizontal space within the FlowFrame to host all of the objects in a single row. Such wrapping is appropriate, for example with certain foreign language versions of a dialog window using FlowFrames where the language is read in a right-to-left fashion, such as, for example, Arabic and Hebrew. Therefore, for purposes of clarity, only right-to-left wrapping is discussed below. However, in the context of the present invention, wrapping may clearly occur in either a right-to-left manner, or in a left-to-right manner, as desired.

2.1 AutoLayout Overview:

By way of introduction, a conventional AutoLayout process is briefly summarized by the following discussion. In particular, to prepare a window, such as a dialog window, for automatic layout computation, a developer must first provide a logical, hierarchical "AutoLayout description" of the dialog, by dividing it into regions, which are in turn divided into sub-regions, etc., all the way down to individual controls. This hierarchy is expressed as a "tree of frames," where each frame represents a rectangular region of the dialog. The root of the tree is the frame encompassing the entire dialog. Further, progressing down the tree, the frames get smaller and smaller, until the frame leaves are reached. The frame leaves are those frames representing areas each occupied by either a single control, or by a group of two or more controls functioning as a single unit. Such frames, i.e., "control frames," can include any of a number of conventional frame types.

There are many different kinds of frames, each engendered by a different C++ class, or other programming language class which can be contained or nested within a FlowFrame. Further, each type of frame that can have multiple children also has a built-in "relation," like vertical or horizontal, specifying how its children are arranged within it. While most controls appear as leaves of the frame tree, sometimes a control appears in an internal node, such as a group-box (label-box) frame; this kind of frame indicates the rectangle occupied by the actual label box control, yet it also has one child commonly a vertical frame of other controls, which are contained inside the group-box.

Figure 2:
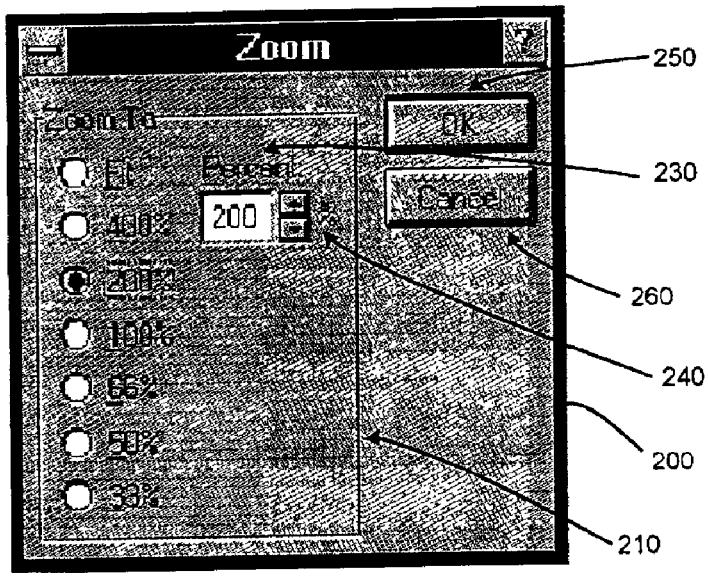
FIG. 2 is an exemplary screen image showing a conventional dialog window.
Figure 3:
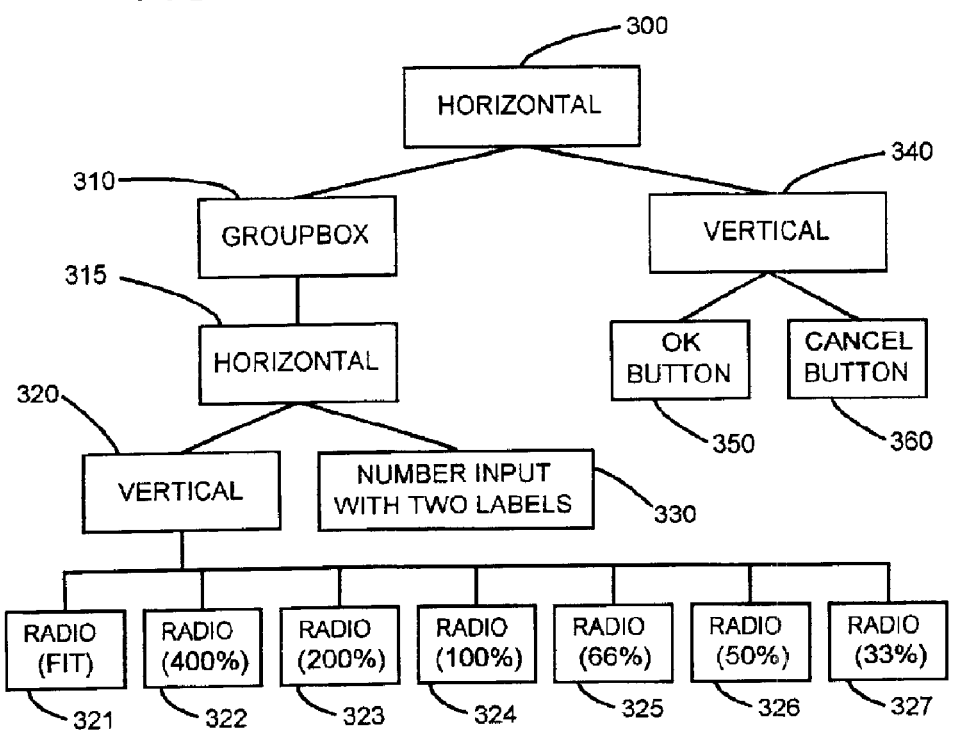
FIG. 3 is an exemplary diagram illustrating a conventional frame tree for describing the dialog window of FIG. 2.

By way of example, FIG. 2 and FIG. 3 illustrate the decomposition of a simple dialog window (FIG. 2) into its frame hierarchy (FIG. 3). Thus, FIG. 3 provides an appropriate frame tree for the automatically laid out Zoom dialog (FIG. 2) based on that tree. In particular, referring both to FIG. 2 and FIG. 3, the Zoom dialog window 200 of FIG. 2 includes a horizontal frame 300 which contains a group box 310 having a horizontal frame 315 graphically delimited by the "Zoom To" area 210 of the Zoom dialog 200. This horizontal frame 315 further comprises a vertical frame 320 which includes individual sibling leaf frames 321 through 327 holding the controls indicating the zoom amount, i.e. "Fit," "400%," "200%," "100%," etc., as illustrated in FIG. 2. Further, the horizontal frame 315 also includes a number input frame 330 having both a text label 230, and a "%" label 240. In addition, the horizontal frame 300 includes a vertical frame 340 which further includes leaf frames having an "OK" control 350 (button 250 of FIG. 2) and a "Cancel" control 360 (button 260 of FIG. 2). Clearly, the concepts illustrated by FIG. 2 and FIG. 3 may be applied to construct a "tree of frames" for a window, such as a dialog window, of any desired complexity.

Before invoking the AutoLayout computation via an "AutoLayout engine," the minimum that a developer needs to do is set up the tree of frames, as described above. Typically, this is accomplished by defining all necessary frame objects (parent frames before children, and sibling frames in the order of their arrangement within their parent) passing into each child frame's constructor a pointer to its parent frame. Then, a conventional Layout( ) method is called on the root of the tree, i.e., horizontal frame 300 of FIG. 3, and all controls will automatically resize and reposition themselves to form a reasonable-looking dialog. Controls are all assigned default sizes depending on the control type and/or the length of the control's text, default margins (the spacing between adjacent controls), and default alignment schemes (generally top-left aligned). But if a developer chooses, any of these defaults may be overridden by setting preferences for these characteristics on a frame-by-frame basis, before calling Layout( ).

Other layout options can also be specified. For example, unequal sizes among children of the same parent (siblings)

will often result in the smaller children having excess "packing area." The packing area represents a rectangular area within a parent frame that is reserved exclusively for a particular child frame within that parent frame, and which no sibling will ever invade. Consequently, in order to reduce wasted or unused space within a parent frame, the AutoLayout functionality includes the capability of specifying that any frame at any level in the hierarchy be expanded, either horizontally, vertically, or both, to fill any available excess space.

2.2 FlowFrames Overview:

As noted above, the present invention expands on the aforementioned concept of AutoLayout by the addition of FlowFrames. FlowFrames are automatically and dynamically sized and positioned within a window using the AutoLayout functionality described above, while any children within each FlowFrame are automatically and dynamically sized and positioned within automatically and dynamically created rows within each FlowFrame. In particular, a FlowFrame arranges its children horizontally in a row, like a conventional "Horizontal Frame," but dynamically wraps the children to one or more additional rows, as necessary. Further, in one embodiment, this wrapping is regulated in accordance with predefined relationships between the children, where they cannot all fit into the same row. Finally, each FlowFrame computes its size hierarchically from its children up to the overall window and then back down to the individual children. The automatic layout of FlowFrames is described in further detail below in Section 3.0.

Further features of FlowFrames, as discussed in greater detail below, include, for example, the capabilities of setting margins between rows in a FlowFrame, adjusting the width of rows within a FlowFrame, indenting entire FlowFrames, or certain rows within a FlowFrame, indenting and/or justifying wrapped children (left, right, or center justifying), distributing rows to fill available space within a FlowFrame, distributing children within rows, binding children in groups of two or more for controlling how children wrap, determining which row within a FlowFrame children are wrapped into, and expanding particular children to fill particular rows. Additionally, FlowFrames also provide the capability to specify the vertical alignment of child frames within a particular row of a given FlowFrame. For example, with respect to such vertical alignment, child frames of different heights that appear in the same row of a FlowFrame can be top, center, or bottom aligned with respect to each other in their row. Section 3.1 below provides exemplary methods for implementing these features and defining relationships between children within a FlowFrame.

Figure 4:
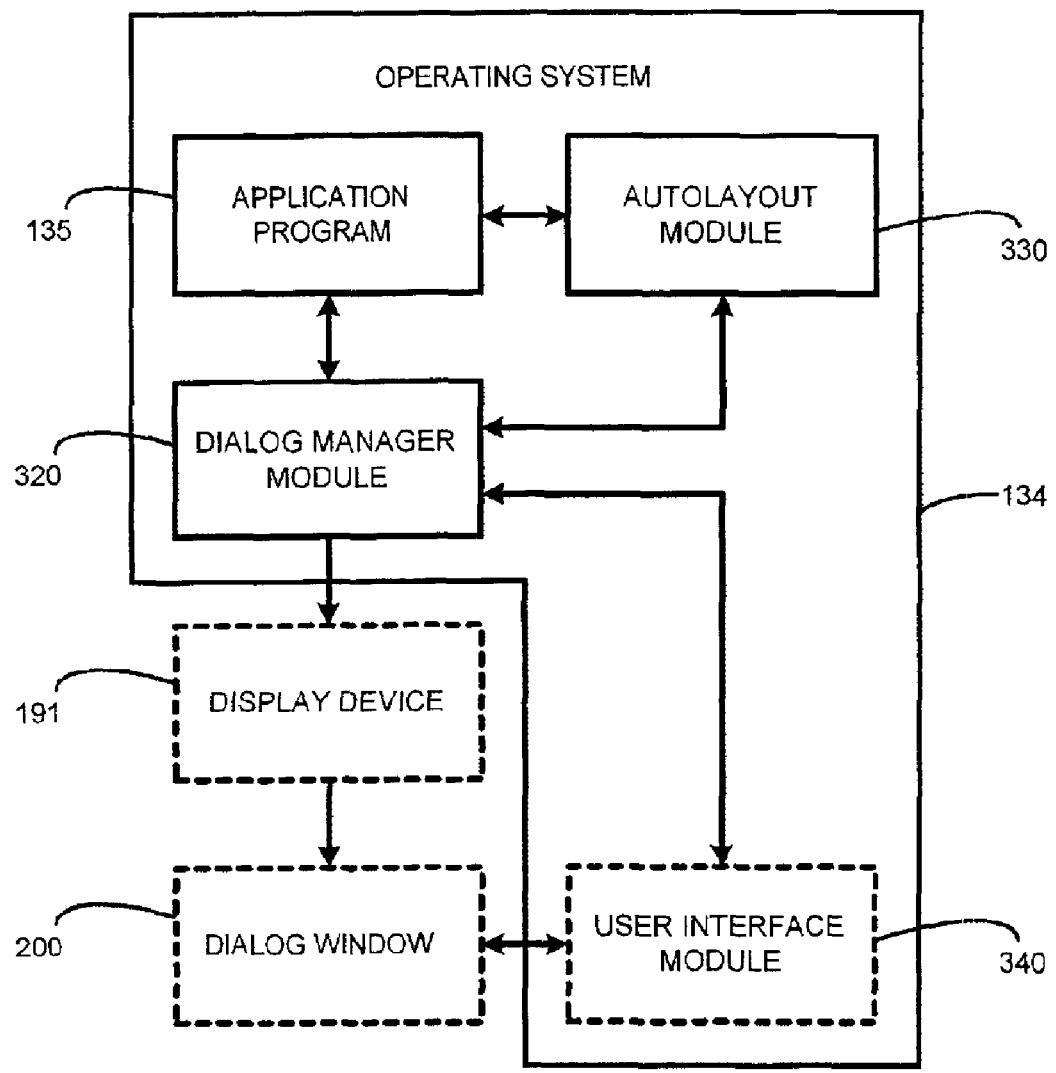
FIG. 4 illustrates an exemplary architectural flow diagram for implementing the present invention.

2.3 System Overview:

FIG. 4 is a general system diagram illustrating program modules for implementing the present invention. It should be noted that the boxes and interconnections between boxes that are represented by broken or dashed lines in FIG. 4 represent alternate embodiments of the present invention, and that any or all of these alternate embodiments, as described below, may be used in combination.

In general, the present invention dynamically and automatically lays out elements within a window by using dynamically resizable FlowFrames disposed within a window. In particular, with reference to FIG. 4, in combination with FIG. 1, and FIG. 2, FIG. 4 illustrates interaction between an exemplary operating system (134 of FIG. 1), an exemplary software application program 135, a dialog manager module 320 for managing dialog windows and the like, and an AutoLayout module 330 in accordance with the present invention. In accordance with the present invention, when the software application program 135 is presented with a window, such as, for example, a dialog window or task pane, (see 200 of FIG. 2 for an example) that window may be resized, either automatically, or by user interaction with the window via a user interface module 340. Techniques for resizing such windows 200 are well known to those skilled in the art.

The dialog manager module 320 is a program module containing computer executable instructions for managing the display of the window 200 on the user's computer 100 in connection with the software application program 135. The dialog manager module 320 may be a program module resident in the software application program 135, or as is well understood by those skilled in the art, the dialog manager module may be a dynamic-link library (DLL) that is a set of computer executable routines that may be called by any of a number of software application programs for execution of its functionality. After the dialog manager module 320 is notified by the operating system 134 that the window 200 is being resized, the dialog manager module 320 notifies the software application program 135, which then calls the AutoLayout module 330.

The AutoLayout module 330 is a program module containing the functionality for laying out the placement and size of all of the controls contained within the window 200, as discussed in further detail below in Section 3.0. When the window 200 is created during runtime of the software application program 135, the AutoLayout module 330 determines the layout of the dialog window 200 in accordance with rules set up by the developer of the software application program 135. Those rules may include, among other things, the size of the window 200, including its width and height in a standard measuring system such as pixels. The rules may also include the size of all controls to be located within the borders of the window 200. Further, the rules may also include the relative positions of the FlowFrames, within the borders of the dialog window 200, as well as any relationships between any children within particular FlowFrames. Such relationships between children may include, as noted above, grouping or desired relative positions between two or more controls or groups of controls within particular FlowFrames.

In general, a set of rules for governing the layout of the window 200 do not set specific locations of and distances between controls. In contrast, these rules instruct the AutoLayout module 330 on the relative locations of those controls. For example, referring back to FIG. 2, the rules for a given window 200 may require that a "Cancel" button 260 be placed in the upper right-hand corner of a FlowFrame within the window, while an "OK" button 250 is to be placed to the immediate left of the Cancel button with the same row of the FlowFrame, space permitting. According to those rules, when the AutoLayout module 330 lays out the window 200, it places the Cancel button 260 in the upper right-hand corner, with the OK button 250 to its left. If the size of the window 200 is changed, the AutoLayout module 330 follows the rules set by the software application developer and maintains the Cancel button 260 in the upper right-hand corner of the window regardless of the size of the dialog window 200, while the OK button 250 will remain to the left of the Cancel button so long as they both fit into the same row of the FlowFrame. When these buttons no longer both fit into the same row of the FlowFrame, a new row is instantiated within the FlowFrame below the row in which the Cancel button 260 currently resides, and the Cancel button is moved to the right corner of the newly instantiated row, as is illustrated in FIG. 2.

After the size of the window 200 is changed during operation of the software application program 135, the AutoLayout module 330, in accordance with the rules set by the program developer, places and sizes the FlowFrames, and the children within each FlowFrame within the newly sized dialog window. Similarly, in a related embodiment, during resizing of the window 200, the AutoLayout module 330 dynamically places and sizes the FlowFrames, and the children within each FlowFrame while the window is being resized. As the AutoLayout module 330 determines the positions and sizes of the FlowFrames, and the children within each FlowFrame in the window 200, the AutoLayout module calls each FlowFrame and child to be moved or resized as necessary. For example, after the AutoLayout module 330 determines to move the Cancel button 260, as described above, the AutoLayout module notifies the Cancel button that it needs to change its state of size and/or position within the FlowFrame.

In one embodiment, a minimum size is set for the window 200 by the AutoLayout module 330, and the minimum size is stored by the dialog manager 320. If a user attempts to resize the window 200 to a size less than the minimum size, the dialog manager 320 prevents the user from so doing. Alternately, in a related embodiment, the FlowFrames and children within the FlowFrame in a window 200 have a minimum size, and they will not be reduced below that size. However, the window 200 itself may actually be reduced in size to a point where it is smaller than the minimum size of one of the FlowFrames in the window and the children within a row of that FlowFrame. Consequently, in this embodiment, the user is presented with scroll bars or the like so that hidden or clipped portions of the window 200 may be observed and interacted with by the user.

Finally, in one embodiment, the dialog manager module 320 lays out the window 200, including all controls contained therein, on a bitmap off the screen of the user's computer 100. Once the entire window 200 is constructed as a bitmap, the dialog manager module 320 sends the bitmap of the resized window 200 to the display 191 of the user's computer 100. This process may also be used in the case where the window 200 is dynamically rendered to the user's display 191 while the resizing is ongoing.

3.0 Operation Overview:

The above-described program modules are employed to automatically and dynamically size and position one or more FlowFrames within a window, such as, for example, a dialog window, of a computer software application, and any controls, text, nested frames or FlowFrames, or any other elements, i.e., "children," within such FlowFrames as the window is generated. This process is depicted in the flow diagram of FIG. 8 following a discussion of exemplary methods for implementing the aforementioned programs modules.

3.1 Exemplary Methods for Implementing the Program Modules:

A working example of a system and method in accordance with the present invention uses a conventional object-oriented paradigm, in which a "class" defines a set of "attributes" and "methods." However, it should be appreciated by those skilled in the art that a non-object-oriented embodiment may be implemented using the concepts described herein. With respect to the object-oriented paradigm, an "object" of the class includes the "attributes" and "methods" of the class. A method comprises program code, and is analogous to a "function" that can be invoked on a particular object. A "subclass" of a class may be defined, wherein the subclass "inherits" the attributes and methods of a "superclass," i.e., the parent class. The inherited attributes and methods may be modified, or new attributes and methods may be added to the class. An object of the subclass correspondingly obtains the attributes and methods of the subclass.

In accordance with this brief discussion of the relationship between objects, methods, attributes, and classes, it should be noted that in a working embodiment of the present invention, FlowFrames, as described herein, can be considered as a subclass of a "CompositeFrame" class which is in turn a subclass of a "Frame" class, each as defined and described with respect to conventional C and C++ programming languages and the like. Consequently, the methods of the conventional CompositeFrame and Frame classes, which are inherited by subclasses, such as, for example, "HorizFrame," "VertFrame," and "TableFrame" classes, will also apply to the FlowFrames class as a sub-class of the CompositeFrame class. Classes such as CompositeFrame, Frame, HorizFrame, VertFrame, TableFrame, etc., are well known to those skilled in the art. Therefore, as such classes are well known to those skilled in the art, particular methods belonging to such classes are introduced below to illustrate exemplary FlowFrame functionality without fully defining the particular methods of the known, conventional, classes. Further, it is clear that the methods embodied in the FlowFrames class may be implemented with programming languages other than C and C++.

Exemplary FlowFrame class definitions for implementing a system and method according to the present invention are provided in the following sections which contain comments explaining exemplary FlowFrame class methods. The FlowFrame class represents an internal node in a tree of frames in which the root node represents the entire window or dialog, the leaf nodes represent individual controls, and the internal nodes represent rectangular regions or sub-regions of the window or dialog. It should be appreciated by those skilled in the art that, in operation, such FlowFrame methods can be called by client programmers to customize the behavior of individual FlowFrames. Further, it should be appreciated that such methods may be used in numerous combinations with the methods of the FlowFrame class, as well as with the methods of parent classes such as CompositeFrame and Frame. As such, the methods of the FlowFrames class are clearly not limited to the examples provided herein. Further, while the methods described below are discussed with reference to dialog windows, it should be appreciated that such methods are applicable to any type of window that can be displayed in a windowing environment.

3.1.1 Set Vertical Margin Method:

This method, i.e., "SetVertMargin" is used for setting the vertical margin between rows within a FlowFrame. All rows within a particular FlowFrame share the same margin, since it is initially unknown which children will end up in which row within the FlowFrame. This method is useful for allowing a program developer or user to set vertical margins between the rows to other than a default separation. Further, in one embodiment, this method may be used to specify the vertical margin between rows as a proportion of the height of a main font used in the dialog window. This way, if the dialog window is modified to use a larger or smaller font, the spacing between rows is automatically adjusted accordingly. Additionally, in a working example of the present invention, horizontal margins between children within a particular FlowFrame are set by calling a conventional Frame::SetMargin( ) method on the individual children.

3.1.2 Shrink Width Method:

This method, i.e., "ShrinkWidthBy" is used to reduce a "flow width" of the rows of a particular FlowFrame by a specified amount. By default, when a FlowFrame is constructed, the width, i.e., the "flow width" of that FlowFrame is set equal to the dialog window's visible client width, i.e., the size of the visible window, minus any left and right border margins. However, if the FlowFrame is positioned using an additional indentation from the left side of the dialog window, then the default flow width will be too great, and the FlowFrame may extend past the right side of the visible window. In such a case, clipping of the children or controls within the FlowFrame may occur. Among other things, this function is useful for correcting such discrepancies.

One example of using the "ShrinkWidthBy" method in combination with conventional methods of the aforementioned classes, i.e., CompositeFrame, Frame, HorizFrame, VertFrame, TableFrame, etc., is provided by the following text. For example, a FlowFrame may be placed inside a conventional GroupBoxFrame, which is used to place a conventional group box or similar control around a group of other controls, insetting them within the surrounding control by certain standard left, right, top, and bottom margins. In this case, ShrinkWidthBy (GROUPBOX_LEFT_MARGIN+GROUPBOX_RIGHT_MARGIN) may be called to account for the extra insetting of the FlowFrame from the left and right borders of the dialog window, so that the right side of the FlowFrame doesn't extend beyond the right side of the dialog, nor far enough to push the right side of the group box control beyond the right side of the dialog.

Figure 5:
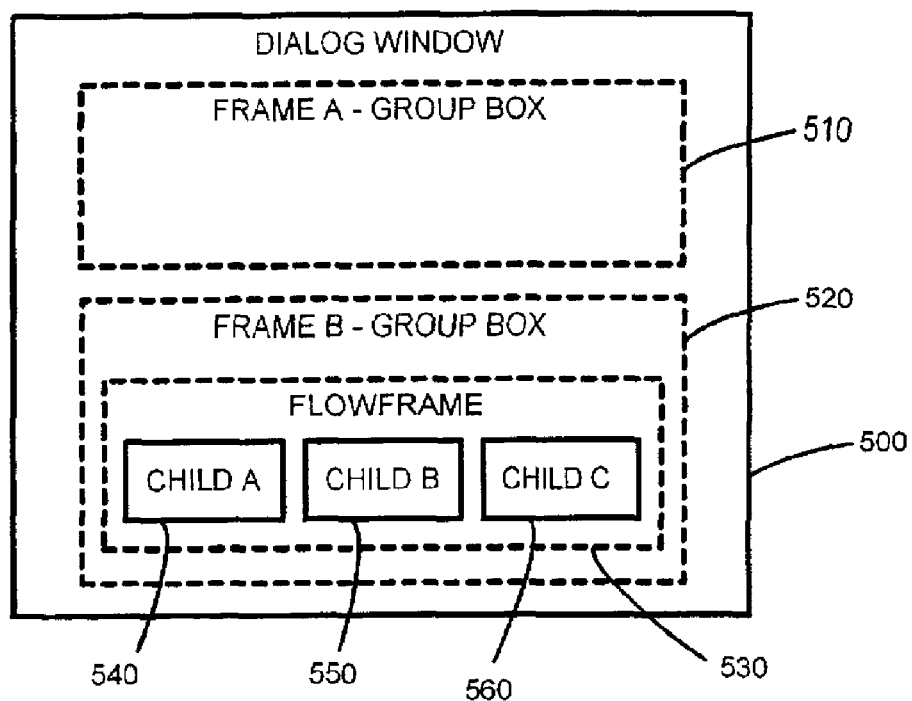
FIG. 5 is an exemplary schematic of a dialog window containing a FlowFrame having embedded children.

For example, as illustrated by FIG. 5, an exemplary schematic of a dialog window 500 contains two group box frames, Frame A and Frame B, 510 and 520, respectively. The Frame B group box 520 includes a FlowFrame 530 having children 540, 550 and 560. Because the default or specified interior margins for the Frame B group box 520 will be known, use of the ShrinkWidthBy method on the FlowFrame 530 included within the Frame B group box will serve to resize the FlowFrame to fit within the margins of the Frame B group box. Consequently, there is no need for the user or developer to manually compute and specify the final size of the FlowFrame 530 when insetting or nesting the FlowFrame within the Frame B group box. The user or developer can instead take advantage of the automatically computed initial width of the FlowFrame 530 and simply reduce the width by the necessary amount.

Alternatively, to discard the automatically computed default initial flow width altogether, and set a custom width that may or may not even be related to the width of the dialog window, the SetWidth( ) method (inherited from the Frame class) may be called on the FlowFrame. Further, in one embodiment, if a FlowFrame is indented explicitly by calling a conventional Indent or IndentBy( ) method (inherited from the Frame class), rather than implicitly by inserting it into a parent frame that automatically insets or indents it such as a GroupBoxFrame, then a corresponding call to ShrinkWidthBy is not necessary, as the flow width will shrink automatically by the amount of the indent.

3.1.3 Indent Latter Rows Method:

This method, i.e., "IndentLatterRows," indents all rows after the first, by a standard indent width. In other words, this method will automatically align elements using a standard indent as they wrap into new rows as the window shrinks.

3.1.4 Specify Indent Latter Rows Method:

This method, i.e., "IndentLatterRowsBy," indents all rows after the first row, by a specified indent width. In other words, this method will automatically align elements using a specified indent as they wrap into new rows as the window shrinks.

3.1.5 Indent Latter Rows by First Child Method: This method, i.e., "IndentLatterRowsByFirstChild," indents all rows after the first row, such that the left edge of the first child in each of the subsequent rows aligns with the left edge of the second child of the first row. If any latter row child is too wide to fit (even in its own row) after being indented by that amount, then all of the latter rows are indented only by the standard indent width, assuming that the standard width is less than the specified width, and the FlowFrame's second child moves down to start on a new row, also indented by the standard indent width.

Figure 6A:
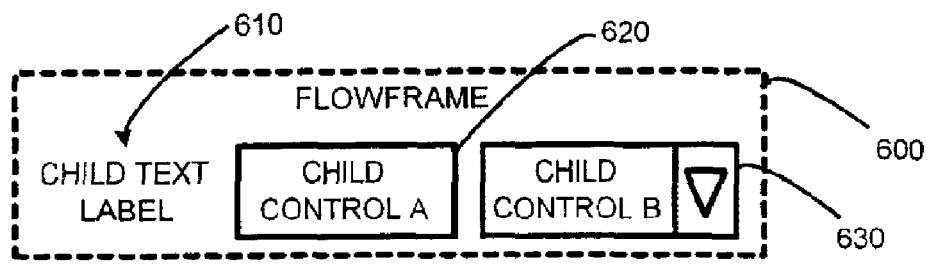
FIG. 6A is an exemplary schematic of a FlowFrame having embedded children.
Figure 6B:
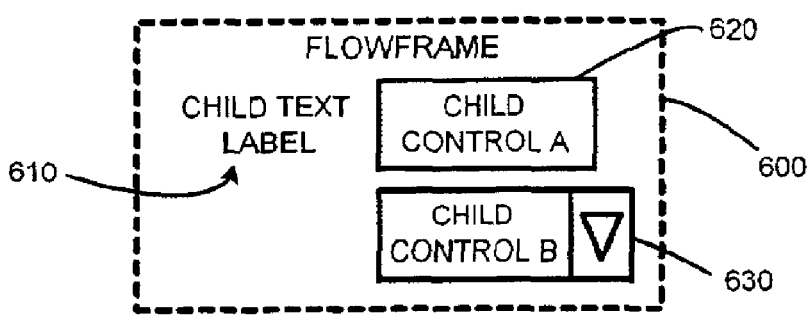
FIG. 6B is an exemplary schematic of the FlowFrame of FIG. 6A, showing wrapping of children as the FlowFrame is reduced in width.

For example, as illustrated by FIG. 6A and FIG. 6B, the IndentLatterRowsByFirstChild method is useful where two or more children have a relationship which it is desired to maintain. In particular, FIG. 6A shows a FlowFrame 600 having three child frames with associated controls, "Child Text Label" 610, "Child Control A" 620, and "Child Control B" 630. Child Control A 620 is separated from Child Text Label 610 by either a standard or specified margin from the right edge of Child Text Label. In this case, it is desired to keep Child Text Label 610 in association with both Child Control A 620 and Child Control B 630. Consequently, as the width of the FlowFrame is reduced as illustrated by FIG. 6B, using the IndentLatterRowsByFirstChild method on the FlowFrame of FIG. 6A serves to automatically cause Child Control B 630 to be left aligned with Child Control A 620 as Child Control B wraps to the next row and is indented by the size of the first child, i.e. Child Text Label 610, plus the margin following it.

3.1.6 Distribute Rows Method:

This method, i.e., "DistributeRows," Makes the rows repel each other, and spread throughout the available space with equal distances between each of the rows.

3.1.7 Distribute Children Method:

This method, i.e., "DistributeChildrenHorizontal," makes the children in a row repel each other, and spread throughout the available space with equal horizontal margins between the children in the row.

3.1.8 Bind Child Pair Method

This method, i.e., "BindChildPair," binds a first child with the child immediately following it. In addition, this method, called in succession, is useful for binding a set of more than two children. The bound set of children will all be kept in the same row whenever the flow width is great enough to make that possible, even if that results in less efficient use of the preceding and succeeding rows. But if the flow width is too narrow to hold them all in the same row, then the bound set will be broken up into multiple rows, without any special indentation of the latter rows of the bound set aside from existing indentation due to any of the IndentLatterRows( ) methods, i.e., IndentLatterRows, IndentLatterRowsBy, or IndentLatterRowsByFirstChild. Further, if a bound set of children must be broken into multiple rows, then no child from outside of that bound set will appear on the same row as any child from that bound set.

Figure 7A:
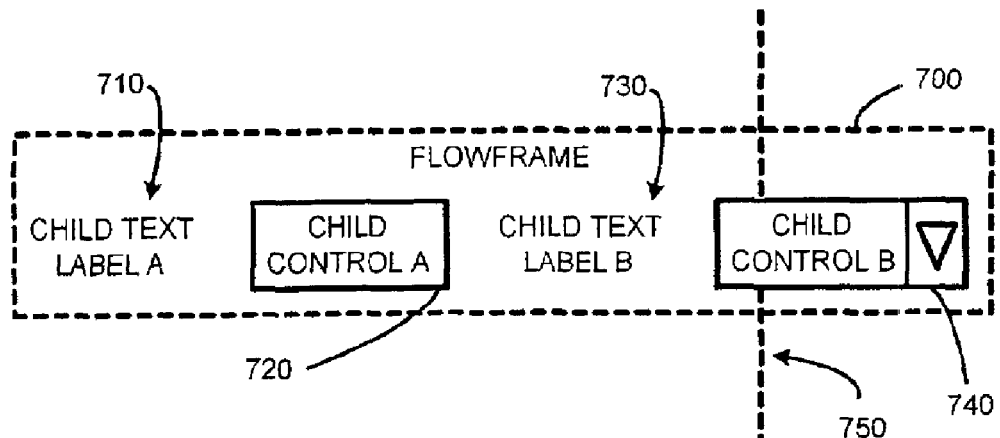
FIG. 7A is an exemplary schematic of a FlowFrame having embedded children.
Figure 7B:
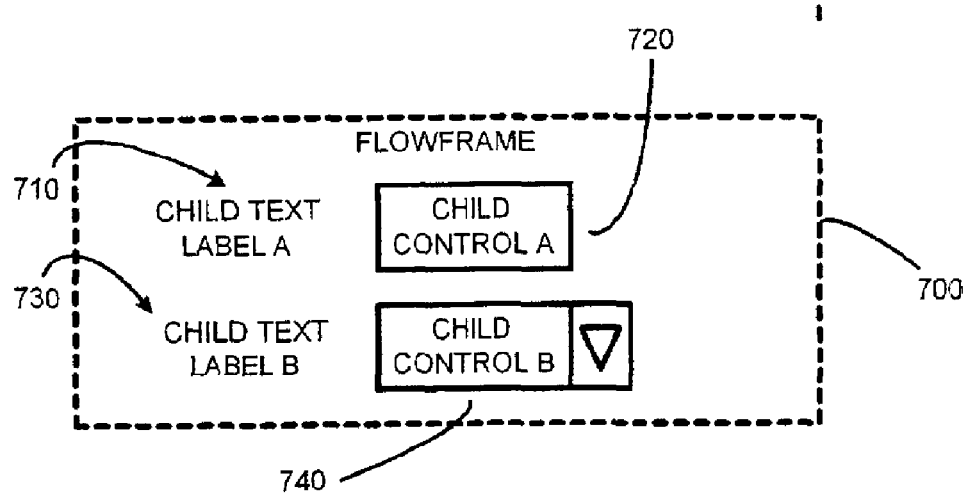
FIG. 7B is an exemplary schematic of the FlowFrame of FIG. 7A, showing wrapping of bound children as the FlowFrame is reduced in width.

For example, as illustrated by FIG. 7A and FIG. 7B, the BindChildPair method ensures that a desired spatial or visual relationship between children can be maintained, space permitting, regardless of how many rows are created by the FlowFrame. In particular, as illustrated in the FlowFrame 700 of FIG. 7A, the FlowFrame includes four child frames with associated controls, "Child Text Label A" 710, "Child Control A" 720, "Child Text Label B" 730, and "Child Control B" 740. The BindChildPair method has been used in this example to bind the first control, "Child Text Label A" 710, to the second control, "Child Control A" 720. Further, the BindChildPair method has also been used in this example to bind the third control, "Child Text Label B" 730, to the fourth control, "Child Control B" 740. When the width of the FlowFrame is reduced from its initial size to the point where the dashed line 750 crosses the dialog window, the FlowFrame is automatically vertically resized, and both the third and fourth controls, "Child Text Label B" 730, and "Child Control B" 740, respectively, wrap to a newly instantiated row below the top row, as illustrated by FIG. 7B. It can be seen by FIG. 7A that the dashed line 750 actually crosses the position of the fourth control, "Child Control B" 740. Consequently, there is still sufficient room within the resized row of the FlowFrame to hold the third control, "Child Text Label B" 730. However, because the third control, "Child Text Label B" 730, has been bound to the fourth control, "Child Text Label B" wraps with the fourth control as described above and as illustrated by FIG. 7A and FIG. 7B.

3.1.9 Get Row Method:

This method, i.e., "GetRowOccupiedByChild," returns the row number that the child is in. This method can only be called after Layout( ), since the child frames are not yet assigned to rows prior to Layout( ). There is no convenient way to tell in advance which row any of the children will end up in after resizing a FlowFrame. Consequently, this method is very useful in that it allows for further customization of children within a FlowFrame depending upon their orientation and their neighbors in any given row. For example, a simple example of a FlowFrame includes three child frames with associated controls in a single row of a FlowFrame, i.e., a text label followed to the right by an edit box, followed to the right by a drop-down box, respectively. Given this simple example, one exemplary utility of the GetRowOccupiedByChild method is to provide a simple "If" type logic test within the code describing the FlowFrame such that if the edit box winds up in the same row as the text label then, in a second AutoLayout iteration, expand the edit box vertically or horizontally to fill the available space within the row or frame. Clearly, the utility of this method is not limited by this simple example, which is provided merely as example of one of a number of uses for the GetRowOccupiedByChild method.

3.1.10 Expand Child to Fill Row Method:

This method, i.e., "ExpandChildToFillRowVert," expands the child to fill the vertical space in the row, without expanding the row height. To also expand the row to fill all available vertical space in the FlowFrame, the method ExpandToFillVert( ), which is defined for the Frame class and can therefore be called on any frame, is called on the child.

3.2 Process Operation:

As noted above, the program modules described in Section 2.0 with reference to FIG. 4 are employed to automatically and dynamically size and position one or more FlowFrames within a window of a graphical user interface as the window is generated or resized. Further, child frames, representing one or more controls, as described above, are sized and positioned within one or more dynamic rows within the FlowFrames as the window is generated or resized. This process is depicted in the flow diagram of FIG. 8. It should be noted that the boxes and interconnections between boxes that are represented by broken or dashed lines in FIG. 8 represent alternate embodiments of the present invention, and that any or all of these alternate embodiments, as described below, may be used in combination.

Figure 8:
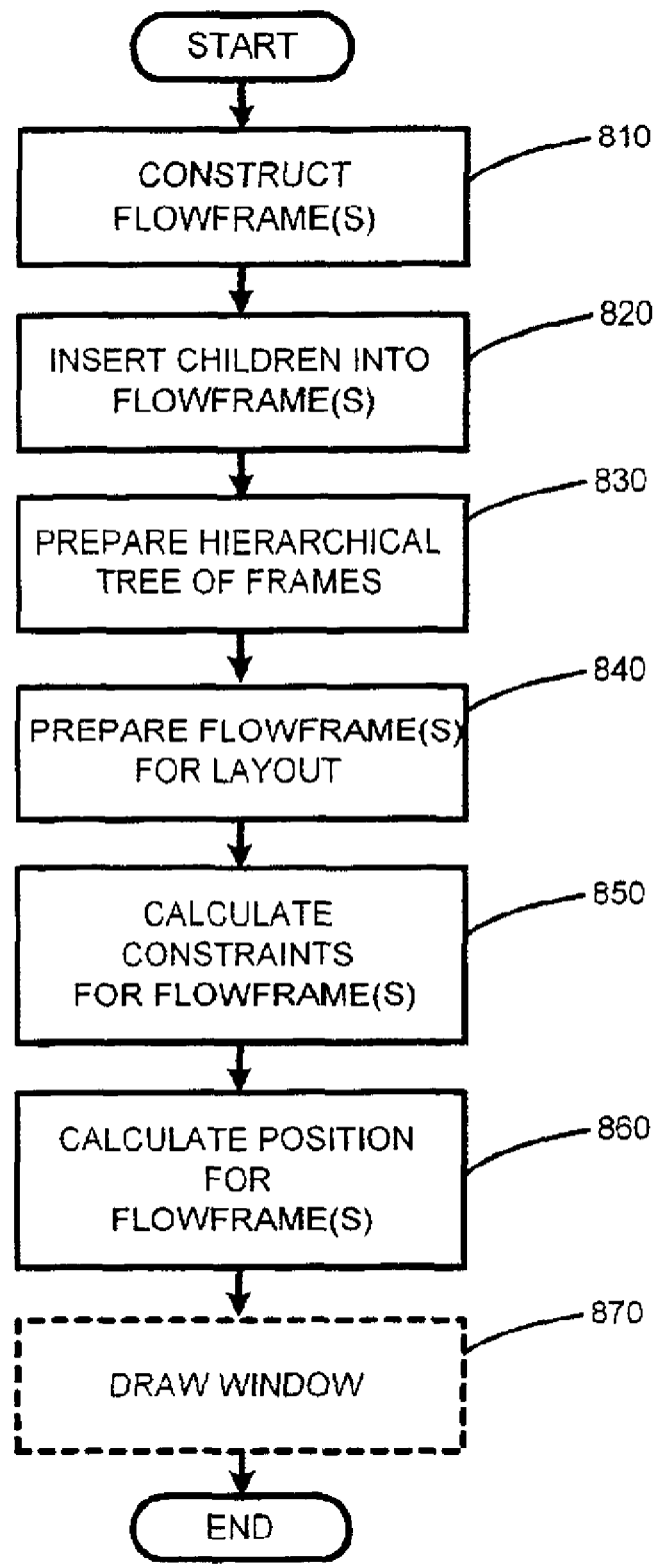
FIG. 8 is an exemplary flow diagram for implementing a working example of the present invention.

Referring now to FIG. 8 in combination with FIG. 4, the process is started by constructing one or more FlowFrames (Box 810) within a parent or root frame representing an overall widow, dialog window, or task pane. Next, any number of child frames representing controls, labels, text, etc., are inserted into the FlowFrame (Box 820) in a manner similar to inserting such objects into a conventional frame. Once the FlowFrames have been populated with children, a hierarchical tree of frames is generated (Box 830) which illustrates the relationships between all of the frames and children within and up to the root frame. See Section 2.1 and FIG. 3 for a discussion of a hierarchical tree of frames.

Next, an automatic recursive preparation for FlowFrame layout (Box 840) begins for the FlowFrames within the overall window. This recursive preparation begins by setting the flow width of each FlowFrame equal to the width of the overall window, less any margins or indenting for particular FlowFrames, as described above. Further, during this step, if all children of a particular FlowFrame are control frames representing controls of the same type, then the vertical margins between the rows of the FlowFrame may be automatically changed from the default vertical margin size to the standard margin size for vertically separating controls of that specific type. The preparation for FlowFrame layout (Box 840) is recursive in the sense that the preparation recurses down the hierarchical frame tree until the frame leaves are reached.

Once the flow widths and vertical margins have been set (Box 840), constraints are calculated for each FlowFrame (Box 850). These constraints represent the minimum space requirements of each FlowFrame. In particular, the constraints calculate the minimum area required by each frame by traversing the tree in postfix (bottom-up) order. Each leaf control frame knows its own space requirements, based either on the default size or a size explicitly set by the developer. Going up the tree, each parent frame automatically figures out how large a rectangle it needs in order to fit all of its children and the margins between them. For example, during this step, each FlowFrame arranges its children into rows, so that it can use the number and heights of its rows in computing its own minimum size. After the root frame has determined its size requirements, the total size of the window or dialog is known. Further, as described below, in one embodiment, the window is resizable using conventional techniques for resizing windows in a windowing environment, either automatically, or by user action via a user interface. Thus, in such an embodiment, the size of the root frame is determined via resizing of the window.

Once the size constraints for each FlowFrame have been calculated (Box 850), a final position of each FlowFrame within the overall window is calculated (Box 860). In particular, a recursive procedure is used to calculate the final positions for the flow frames which includes adjusting the final sizes of all frames and setting frame positions within the overall window or dialog. This is done by traversing the hierarchical tree in prefix (top-down) order. The root sets the position of each of its children within the dialog. Each child, now knowing where its own rectangle is positioned, sets the position of its children, and so on, until the position of every control is set. Sizes (width and height) of frames are not usually changed in this second phase of the algorithm, unless an expand-to-fill-available-space option or the like was specified using a method inherited from one of the conventional classes discussed above.

The calculated final positions for all FlowFrames (Box 860), are then used to create a final layout for the overall window. In particular, the final size and position of each flow frame is known from the step described with respect to Box 860, while the minimum size and margins for each of the children within each FlowFrame is known from the steps described with respect to Box 840 and 850.

Finally, once the steps described above have been completed, the layout of the window may be saved for later use, or alternately, the layout information may be used to render the window to a display device having a graphical user interface (Box 870 of FIG. 8) using conventional techniques. For example, as discussed herein, the step of drawing the window to the screen can be done off-screen, then rendered to the display, or may be done on-screen in real time as a window containing FlowFrames is resized.

In addition, it should be noted that in one embodiment, text type controls, i.e., a static text label, or a checkbox or radio button control containing an included text label, or the like, within a FlowFrame will automatically wrap where there is insufficient horizontal space available. In particular, a FlowFrame will automatically wrap text controls that are too wide to fit within the flow width of a given row of the FlowFrame as a single unwrapped text line. Further, it should be noted that such wrapping does not occur in a new FlowFrame row, but rather, within the same FlowFrame row. In particular, a text control is made to wrap simply by reshaping it to be narrower and taller such that more than one row of text, as needed, will fit within the text control, which is itself contained within a single FlowFrame row. In other words, the text control remains a single, rectangular control in a single row of the FlowFrame.

4.0 Working Example:

In a simple working example of the present invention, a series of screen images, illustrated by FIG. 9 through FIG. 14, is used to demonstrate the concept of FlowFrames in accordance with the present invention by showing the incremental effect of continuing to narrow a dialog window. In particular, this sequence of screen images illustrates how a Slide Transition task pane window automatically adjusts its layout as it is made increasingly narrow by the user.

Figure 9:
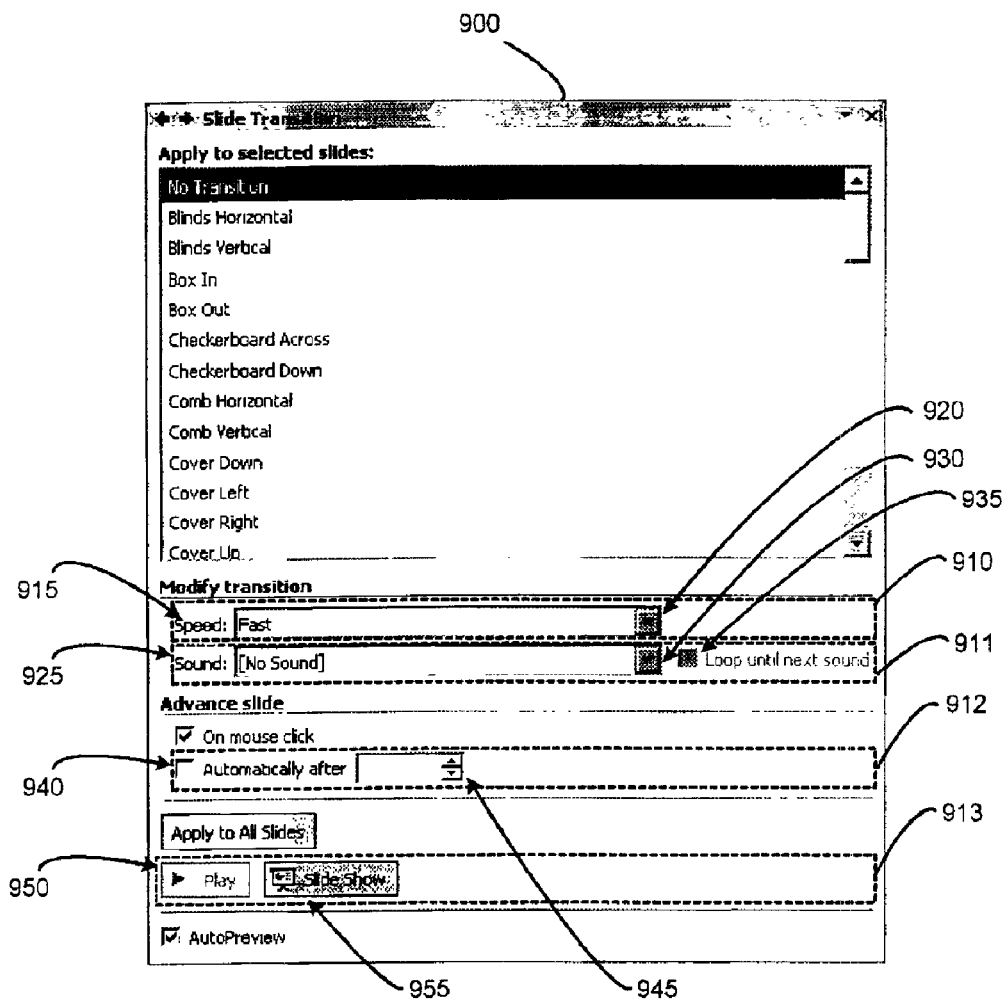
FIG. 9 is an exemplary screen image of a task pane window having multiple FlowFrames, each with nested or embedded children.

FIG. 9 illustrates a relatively wide task pane, i.e. a dialog window, in which there is sufficient room so controls that "prefer" to appear in the same row all do. There are four such rows, 910, 911, 912, and 913, with each row being represented by a separate FlowFrame, indicated by the boxes drawn with dashed lines superimposed on the screen images. Further, as illustrated by FIG. 9 through FIG. 14, each of FlowFrames 910, 911, and 912 are indented relative to the fourth FlowFrame 913. This indenting can be seen be comparing the leftmost edge of each of the FlowFrames, 910, 911, 912 and 913. As discussed above, the amount of indent for FlowFrames, such as FlowFrames 910, 911, and 912, can be either implicitly determined from their nesting within other frames, or explicitly specified by a user or program developer.

The first FlowFrame 910 includes a "Speed" label 915 and dropdown 920 in a single row. The second FlowFrame 911 includes a "Sound" label 925, dropdown control 930, and a "Loop until next sound" checkbox 935 in a single row. The third FlowFrame 912 includes an "Automatically after" checkbox 940, and a number-input control 945 in a single row. The fourth FlowFrame 913 includes a "Play" button 950, and a "Slide Show" button 955 in a single row. Note that in the first and second rows, 910 and 911, i.e., the "Speed" and "Sound" rows, the dropdown controls 920 and 930, respectively, expand to fill available width, so that the "Loop until next sound" checkbox 935 always reaches the right side of the task pane 900.

Figure 10:
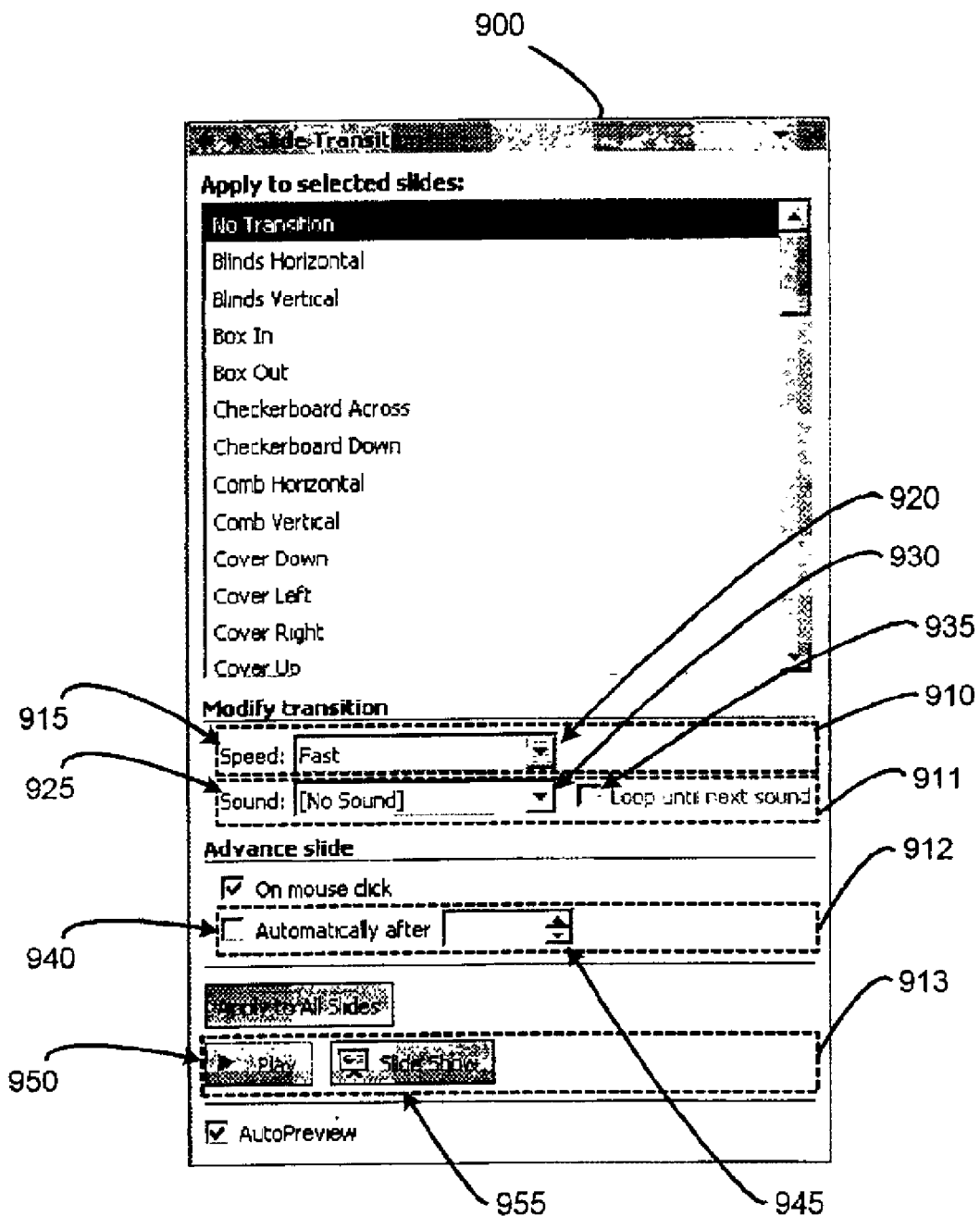
FIG. 10 is an exemplary screen image of the task pane window of FIG. 9, showing the effect on the children within each FlowFrame as the width of the window is decreased.

Next, as illustrated by FIG. 10, the dropdown controls 920 and 930 are the first things to shrink as the task pane 900 is made narrower. These dropdown controls 920 and 930 will continue to shrink as the task pane is narrowed until they reach their minimum specified sizes.

Figures 11, 12:
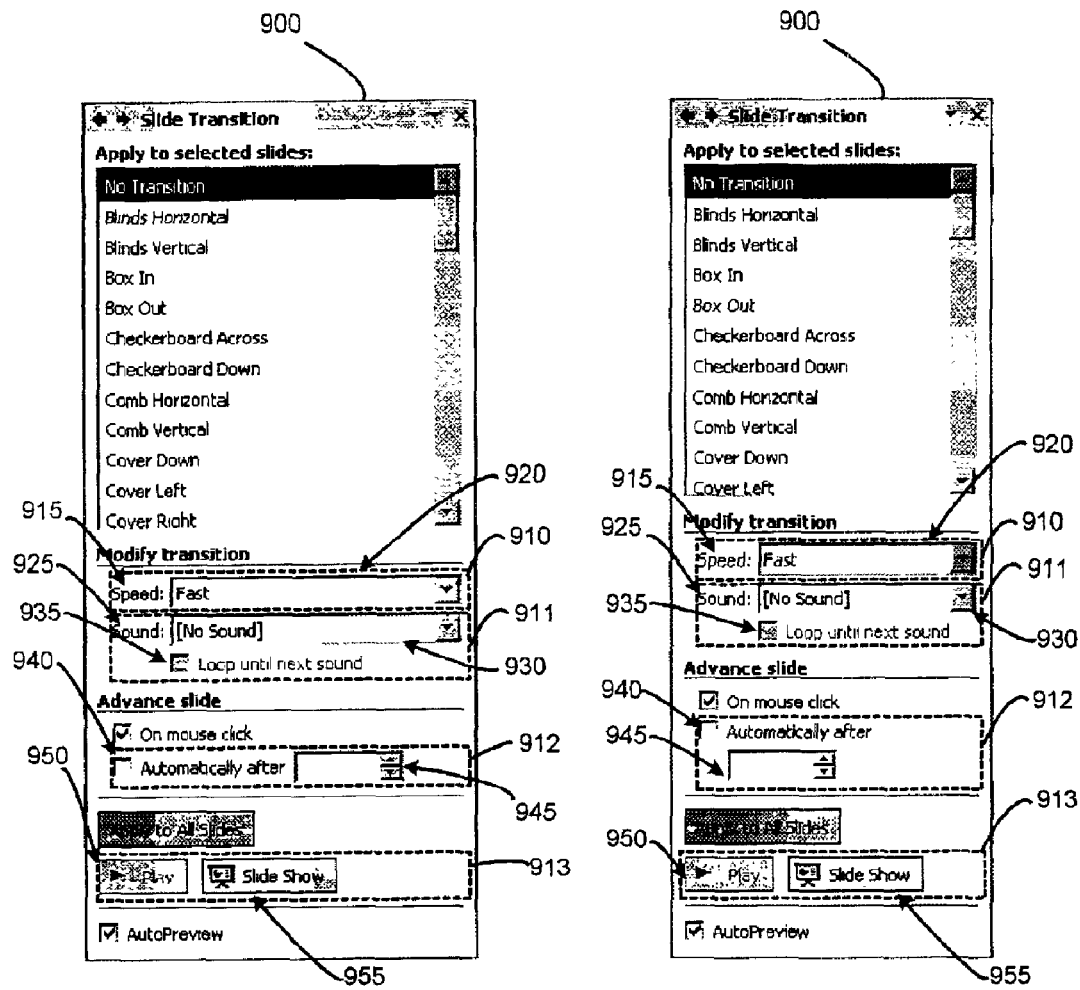
FIG. 11 is an exemplary screen image of the task pane window of FIG. 10, showing the effect on the children within each FlowFrame as the width of the window is decreased.
FIG. 12 is an exemplary screen image of the task pane window of FIG. 11, showing the effect on the children within each FlowFrame as the width of the window is decreased.

Next, as illustrated by FIG. 11, as the task pane is made narrower still, the "Loop until next sound" checkbox 935 can no longer fit in the same row, since the "Sound" dropdown 930 to its left must maintain its minimum width. Consequently, the "Loop until next sound" checkbox 935 drops to form a second row within the second FlowFrame 911. The "Loop until next sound" checkbox 935 is indented to be aligned with the dropdown 930 above it, emphasizing that the checkbox and the dropdown above it are both members of the "Sound" group. Note that as illustrated by FIG. 11, the "Automatically after" checkbox 940 and number-input 945 don't have too much horizontal room to spare.

Next, as illustrated by FIG. 12, as the task pane 900 is narrowed still further, the "Automatically after" number-input 945 is the next control to be lowered into its own row by its FlowFrame 912. It is automatically indented by the "standard" indent width (the width of a square checkbox bitmap plus the gap between the checkbox bitmap and the associated text) to emphasize that it is logically associated with the checkbox above it. Further, it can be seen that the "Speed" and "Sound" dropdowns, 920 and 930, respectively, have been squeezed almost to their minimum width. If the task pane is made narrower they may not fit in the same row as their left-side text labels, 915 and 925, respectively.

Figure 13:
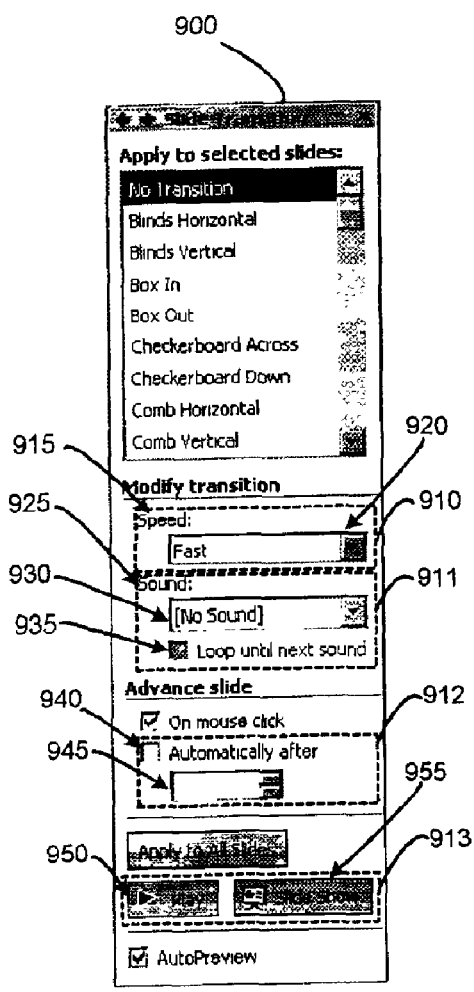
FIG. 13 is an exemplary screen image of the task pane window of FIG. 12, showing the effect on the children within each FlowFrame as the width of the window is decreased.

Next, as illustrated by FIG. 13, as the task pane 900 is narrowed again, it can be seen that the "Speed" and "Sound" dropdowns, 920 and 930, respectively, drop to form their own rows within their respective FlowFrames, 910 and 911. They remain indented by just the small, "standard" indent width, to emphasize their grouping within the "Speed" and "Sound" control groups, 915 and 925, respectively. The "Loop until next sound" checkbox 935 also shifts leftward, to retain its alignment with the dropdown 930 above it.

Figure 14:
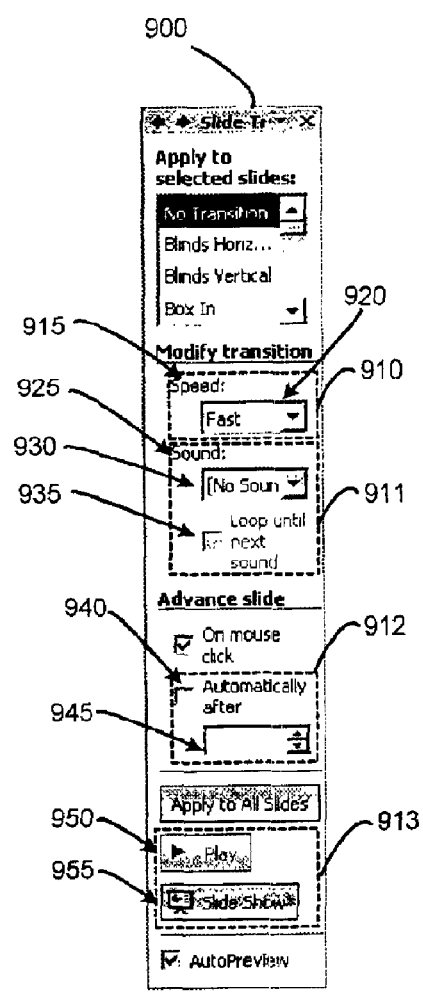
FIG. 14 is an exemplary screen image of the task pane window of FIG. 13, showing the effect on the children within each FlowFrame as the width of the window is decreased.

Finally, as illustrated by FIG. 14, as the task pane 900 is made even narrower, the "Play" and "Slide Show" buttons, 950 and 955, respectively, no longer fit in the same row, so their FlowFrame 913 splits them into two rows. This time the control on the second row (the "Slide Show" button) does not get indented, because the designer of this task pane has determined that there is no logical need for it to be. Also note that various text strings throughout the task pane no longer fit in a single line, so they wrap to multiple lines. Also, as discussed above, it should be noted that such wrapping does not occur in a new FlowFrame row, but rather, within the same FlowFrame row. In particular, a text control is made to wrap simply by reshaping it to be narrower and taller such that more than one row of text, as needed, will fit within the text control, which is itself contained within a single FlowFrame row. The vertical size of a FlowFrame row containing such a text control is automatically increased to accommodate the increased height of the text control. Furthermore, as the narrowing of the task pane causes the controls to occupy more and more rows, and the text to occupy more and more lines, the depletion of vertical space causes the list control near the top to get shorter and shorter (but still taller than its minimum required height, which is two list items tall).

5.0 Additional Embodiments:

Because windows may be resizable, as discussed above, such resizable windows can be resized below a minimum width for fully displaying one or more of the controls within one or more of the rows of one or more FlowFrames. Consequently, where a window is resized in such a manner, in one embodiment, a scroll bar or the like is automatically instantiated within the window to allow a user to scroll the window for viewing obscured or clipped portions of the window. However, in a related embodiment, the user is prevented from reducing the size of the window below a minimum threshold size in order to prevent the clipping of controls or children within any of the FlowFrames in that window. One method for determining this threshold size is to simply set the minimum width of a window to the largest minimum size of any children within the window.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatically and dynamically laying out elements within a window, comprising:
   specifying at least one dynamically resizable frame in a hierarchical tree structure within a parent window;
   specifying at least one child element within at least one of the resizable frames;
   automatically hierarchically computing a size of each dynamically resizable frame based on the hierarchical tree structure, beginning with any child elements within each frame, up to the parent window, and then back down to the individual child elements within each frame;
   automatically creating a minimum sufficient number of horizontal rows within at least one dynamically resizable frame for displaying each of the child elements within each dynamically resizable frame;
   automatically arranging child elements within the automatically created horizontal rows; and
   binding at least two child elements in groups of two or more for controlling how the groups wrap into the automatically created horizontal rows.

2. The system of claim 1 wherein at least one dynamically resizable frame includes any number of nested frames, with at least one of the nested frames further including any number of child elements.

3. The system of claim 1 wherein the window is resizable, and wherein elements within at least one frame are automatically arranged as the window is resized.

4. The system of claim 3 wherein the window is user resizable.

5. The system of claim 3 wherein the window is automatically resized.

6. The system of claim 1 further comprising specifying preferred vertical margins between the automatically created horizontal rows within at least on dynamically resizable frame.

7. The system of claim 1 further comprising automatically adjusting a width of at least one of the dynamically resizable frames by a specified amount.

8. The system of claim 1 further comprising automatically indenting at least one of the automatically created horizontal rows within at least one dynamically resizable frame.

9. The system of claim 1 further comprising automatically aligning at least one child element within at least one of the automatically created horizontal rows within at least one of the dynamically resizable frames.

10. The system of claim 9 wherein automatically aligning at last one child element comprises vertically aligning the at least one child element within at least one row of at least one dynamically resizable frame.

11. The system of claim 9 wherein automatically aligning at last one child element comprises horizontally aligning the at least one child element within at least one row of at least one dynamically resizable frame.

12. The system of claim 9 wherein automatically aligning at lest one child element comprises vertically and horizontally aligning the at least one child element within at least one row of at least one dynamically resizable frame.

13. The system of claim 1 further comprising automatically vertically distributing the automatically created horizontal rows within at least one dynamically resizable frame to fill an available vertical space within the at least one dynamically resizable frame.

14. The system of claim 1 further comprising automatically equally distributing at least one child element within at least one of the automatically created horizontal rows.

15. The system of claim 1 further comprising automatically determining and reporting on which automatically created horizontal rows within at least one dynamically resizable frame holds particular child elements.

16. The system of claim 1 further comprising automatically expanding particular child elements to fill particular automatically created horizontal rows.

17. The system of claim 1 wherein at least one of the child elements includes at least one associated control.

18. The system of claim 17 wherein at least one of the controls is a text control.

19. The system of claim 18 wherein any text contained within the text control is automatically wrapped to at least two lines within the text control without using an additional automatically created horizontal row where the text is too wide to fit a single unwrapped text line within a particular automatically created horizontal row.

20. A computer-implemented process for automatically arranging controls within a window of a graphical user interface, comprising:
   constructing at least one dynamically resizable frame within a parent window;
   inserting at least one control frame having at least one associated control into at least one dynamically resizable frame;
   defining a preferred interrelationship between at least two controls in at least one of the dynamically resizable frames;
   automatically creating a minimum sufficient number of horizontal rows within at least one dynamically resizable frame for displaying the controls within any of the dynamically resizable frames;
   automatically arranging the controls within the automatically created horizontal rows in accordance with any preferred interrelationships between the controls; and
   wherein at least one of the controls is a text control, and wherein any text contained within the text control is automatically wrapped to at least two lines within the text control where the text is too wide to fit as a single unwrapped text line within a particular horizontal row.

21. The computer-implemented process of claim 20 further comprising automatically computing a size of each dynamically resizable frame based on a hierarchical tree structure which defines a structural relationship between each dynamically resizable frame and each control within each dynamically resizable frame within the parent window.

22. The computer-implemented process of claim 20 wherein he window is resizable, and wherein controls within at least one dynamically resizable frame are automatically arranged as the window is resized.

23. The computer-implemented process of claim 20 further comprising an ability to customize the automatic arrangement of elements within at least one of the automatically created horizontal rows of at least one of the dynamically resizable frames by specifying any of:
- a preferred vertical margin between the horizontal rows;
- a preferred width of at least one of the dynamically resizable frames;
- a preferred indenting of at least one of the horizontal rows;
- a preferred horizontal alignment of at least one control within at least on of the horizontal rows;
- a preferred vertical alignment of at least one control within at least one of the horizontal rows;
- a preferred vertical distribution of horizontal rows within at least one dynamically resizable frame;
- a preferred horizontal distribution of controls within at least one of the horizontal rows; and
- a preferred expansion of at least one control within at least one of the horizontal rows.

24. The computer-implemented process of claim 20 further comprising automatically determining and reporting on which automatically created horizontal rows within at least one dynamically resizable frame holds particular child elements.

25. A computer-readable medium having computer executable instinct ions for automatically organizing elements within a user resizable dialog window, said computer executable instructions comprising:
- adding at least one automatically reconfigurable frame to a parent window;
- inserting at least one child element into at least one automatically reconfigurable frame;
- specifying preferred indenting rules for at least one of the child elements;
- dynamically creating wrapable horizontal rows within at least one automatically reconfigurable frame for displaying each of the child elements within any of the, automatically reconfigurable frames;
- automatically arranging child elements within the dynamically created wrapable horizontal rows in accordance with any specified preferred indenting rules as the resizable window is resized; and
- binding at least two child elements in groups of two or more for controlling how the groups wrap into the dynamically created wrapable horizontal rows.

26. The computer-readable medium of claim 25 further comprising creating a hierarchical tree structure which defines a structural relationship between each automatically reconfigurable frame and each child element within the parent window.

27. The computer-readable medium of claim 26 further comprising using the hierarchical tree structure to automatically compute a size of each automatically reconfigurable frame.

28. The computer-readable medium of claim 25 further comprising a capability of nesting any number of frames within at least one automatically reconfigurable frame, with at least one nested frame further including any number of child elements.

29. The computer-readable medium of claim 25 further comprising specifying any of:
- a preferred vertical margin between the dynamically created wrapable horizontal rows within at least one automatically reconfigurable frame;
- a preferred width of the dynamically created wrapable horizontal rows within at least one automatically reconfigurable frame; and
- a preferred indenting width of at least one of the dynamically created wrapable horizontal rows within at least one automatically reconfigurable frame.

30. The computer-readable medium of claim 25 further comprising automatically aligning at least one child element within at least one automatically reconfigurable frame in accordance a specified preferred alignment of at least one child element.

31. The computer-readable medium of 30 wherein automatically aligning at least one child element comprises vertically aligning the at least one child element within at least one dynamically created wrapable horizontal row.

32. The computer-readable medium of claim 30 wherein automatically aligning at least one child element comprises horizontally aligning the at least one child element within at least one dynamically created wrapable horizontal row.

33. The computer-readable medium of claim 30 wherein automatically aligning at least one child element comprises vertically and horizontally aligning the at least one child element within at least one dynamically created wrapable horizontal row.

34. The computer-readable medium of claim 25 further comprising automatically vertically distributing the dynamically created wrapable horizontal rows within at least one automatically reconfigurable frame to fill an available vertical space within the at least one automatically reconfigurable frame.

35. The computer-readable medium of claim 25 further comprising automatically equally distributing each child element within at least one of the dynamically created wrapable horizontal rows.

36. The computer-readable medium of claim 25 further comprising automatically determining and reporting on which dynamically created wrapable horizontal rows hold particular child elements.

37. The computer-readable medium of claim 25 further comprising automatically expanding particular child elements to fill particular dynamically created wrapable horizontal rows.

* * * * *

UNITED STATES PATENT AND TRADEMARK OFFICE
CERTIFICATE OF CORRECTION

| | |
|---|---|
| PATENT NO. | : 6,950,993 B2 |
| APPLICATION NO. | : 09/682185 |
| DATED | : September 27, 2005 |
| INVENTOR(S) | : Steven Adam Breinberg |

It is certified that error appears in the above-identified patent and that said Letters Patent is hereby corrected as shown below:

In column 15, line 51, delete "Indent" and insert -- Indent( ) --, therefor.

In column 15, line 55, delete "ShrinkWidthBy" and insert -- ShrinkWidthBy( ) --, therefor.

In column 16, line 39, after "Method" insert -- : --.

In column 21, line 25, in Claim 1, after "the" insert -- dynamically --, therefor.

In column 21, line 54, in Claim 6, delete "on" and insert -- one --, therefor.

In column 21, line 67, in Claim 10, delete "last" and insert -- least --, therefor.

In column 22, line 4, in Claim 11, delete "last" and insert -- least --, therefor.

In column 22, line 8, in Claim 12, delete "lest" and insert -- least --, therefor.

In column 22, line 34, in Claim 19, after "fit" insert -- as --.

In column 22, line 67, in Claim 22, delete "he" and insert -- the --, therefor.

In column 23, line 14, in Claim 23, delete "on" and insert -- one --, therefor.

In column 23, line 30, in Claim 25, delete "instinct ions" and insert -- instructions --, therefor.

In column 23, line 41, in Claim 25, after "any of the" delete ",".

UNITED STATES PATENT AND TRADEMARK OFFICE
CERTIFICATE OF CORRECTION

PATENT NO. : 6,950,993 B2
APPLICATION NO. : 09/682185
DATED : September 27, 2005
INVENTOR(S) : Steven Adam Breinberg It is certified that error appears in the above-identified patent and that said Letters Patent is hereby corrected as shown below:

In column 24, line 25, in Claim 31, after "of" insert -- claim --.

Signed and Sealed this

Twenty-eighth Day of July, 2009

JOHN DOLL
*Acting Director of the United States Patent and Trademark Office*